United States Patent

[11] 3,575,608

[72] Inventor Donald John Barth
Bedford, Mass.

[21] Appl. No. 845,855
[22] Filed July 29, 1969
[45] Patented Apr. 20, 1971
[73] Assignee RCA Corporation

[54] CIRCUIT FOR DETECTING A CHANGE IN VOLTAGE LEVEL IN EITHER SENSE
4 Claims, 3 Drawing Figs.

[52] U.S. Cl. 307/215, 307/236, 307/291, 328/118, 328/206
[51] Int. Cl. H03k 3/26, H03k 19/34, H03k 19/36
[50] Field of Search 307/215, 291, 218 (LIT.); 328/206, 118; 307/236

[56] References Cited
UNITED STATES PATENTS
3,458,825 7/1969 Lagemann 328/206

*Primary Examiner*—Donald D. Forrer
*Assistant Examiner*—David M. Carter
*Attorney*—H. Christoffersen

ABSTRACT: First and second cross-coupled logic gates respectively connected to third and fourth logic gates, with feedback connections from the third to the second and the fourth to the first gate. The input voltage level whose change in value it is desired to sense is applied to the third gate and its complement is applied to the second and fourth gates. When this input voltage changes its value in one sense, an output pulse is produced by the third gate and when it changes its value in the opposite sense, an output pulse is produced by the fourth gate. The logic gates may be NAND or NOR gates.

INVENTOR.
DONALD J. BARTH
BY Samuel Cohen
ATTORNEY

INVENTOR.
DONALD J. BARTH
BY
ATTORNEY

CIRCUIT FOR DETECTING A CHANGE IN VOLTAGE LEVEL IN EITHER SENSE

BACKGROUND OF THE INVENTION

There are a number of applications in computer systems for a circuit which detects a change in voltage level in either sense. In one particular computer, such a circuit is needed to monitor the "memory request" line. Each time the voltage level on the line changes its value from a voltage representing the binary digit (bit) 1 to a voltage representing the bit 0 or vice versa, it is desired that a pulse be generated. The object of the present invention is to provide a new and relatively simple and inexpensive solution to the problem.

SUMMARY OF THE INVENTION

The circuit of the invention includes first and second cross-coupled logic gates respectively connected to third and fourth logic gates. The output of the third gate is applied to the second gate and the output of the fourth gate to the first gate. The voltage level being monitored is applied to the third gate and its complement is applied to the second and fourth gates.

DETAILED DESCRIPTION

The circuit of the present invention may be constructed with NAND gates. Such a gate implements the Boolean equation $Z=\overline{XY}=\overline{X}+\overline{Y}$. The truth table for a NAND gate is

| X | Y | Z |
|---|---|---|
| 0 | 0 | 1 |
| 0 | 1 | 1 |
| 1 | 0 | 1 |
| 1 | 1 | 0 |

Figure 1:
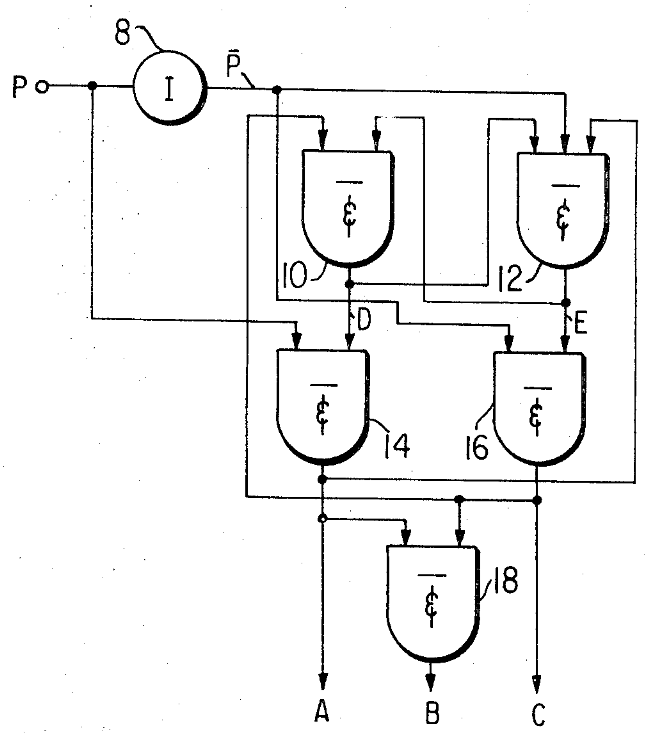
FIG. 1 is a logic diagram of one form of the invention.

The circuit of FIG. 1 includes an inverter 8 and five NAND gates 10, 12, 14, 16 and 18. The first and second NAND gates 10 and 12 are cross-coupled. The output signal D of the first NAND gate 10 is applied to the third NAND gate 14 and the output signal E of the second NAND gate 12 is applied to the fourth NAND gate 16. The output signal A of the third NAND gate 14 is fed back to the second NAND gate 12 and the output signal C of the fourth NAND gate 16 is fed back to the first NAND gate 10. The signals A and C are applied to the fifth NAND gate 18. The voltage level P, which is the input level being monitored, is applied to the third NAND gate 14 and its complement $\overline{P}$ is applied to the second and fourth NAND gates 12 and 16.

Figure 2:
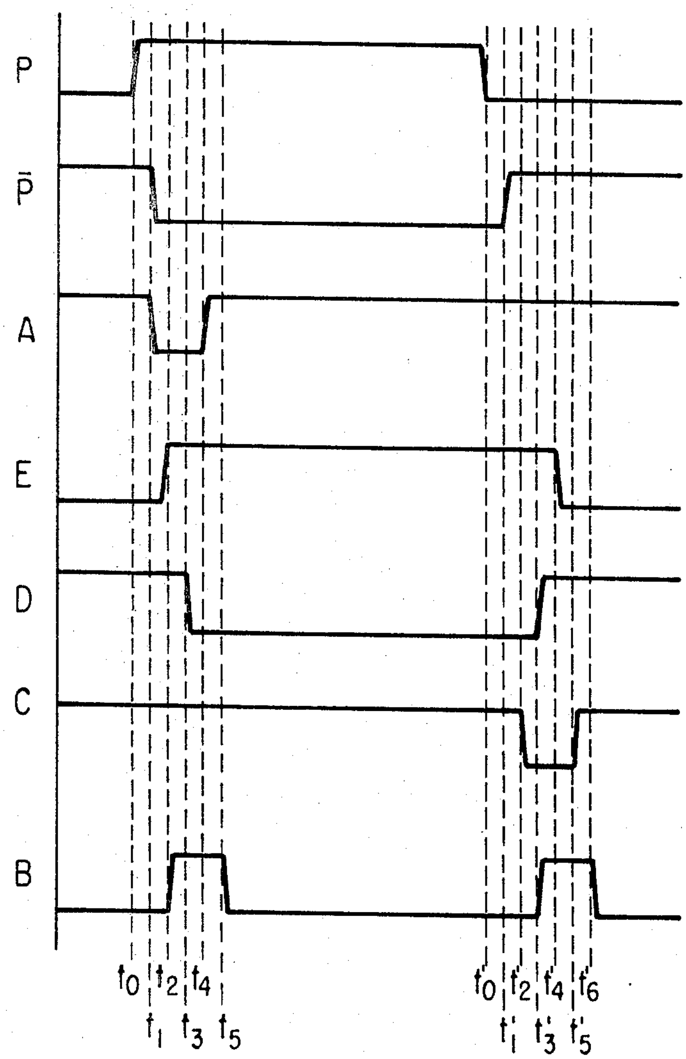
FIG. 2 is a drawing of waveforms to explain the operation of the circuit of FIG. 1.

In the operation of the circuit of FIG. 1, assume that P initially is a relatively low voltage level representing the bit 0 and $\overline{P}$ is a relatively high voltage level representing the bit 1. Analysis of the circuit under these conditions will show that A, D and C are all high voltage levels representing a 1 and E and B relatively low voltage levels representing a 0, all as shown in FIG. 2. (hereafter, rather than referring to voltage levels, reference will be made to the binary digits which are represented by voltage levels).

FIGS. 1 and 2 should now be referred to. In the latter, each interval from $t_n$ to $t_{n+1}$ and from $t'$ to $t'_{+}$ one gate delay interval. At time $t_0$, P changes from 0 to 1. One gate delay interval later at time $t_1$, inverter 8 produces an output $\overline{P}$=0. At this same time $t_1$, gate 14 produces an output A=0, as time $t_1$ is one gate delay interval after P has changed to 1 (the second input D to gate 14 already is 1).

One gate delay interval after A changes to 0, that is, at time $t_2$, E changes to 1. The reason is that A=0 is an input to NAND gate 12 and the latter produces a 1 output when any one or more of its inputs is a 0.

At time $t_2$, C has the value 1. Therefore, the two inputs to NAND gate 10 are 1, so that one gate delay interval later, that is, at time $t_3$, D changes to 0. One gate delay interval later, at time $t_4$, the output of gate 14 changes back to its original value A=1. Thus, a negative pulse has been produced at A which is three gate delay intervals in duration.

Assume now that at some later time $t_0'$, P changes its value from 1 back to 0. One gate delay interval later at time $t_1'$, inverter 8 produces an output $\overline{P}$=1. One gate delay interval later, at time $t_2'$, gate 16 produces an output C=0 as its two inputs both are 1. One gate delay interval later, at time $t_3'$, D the output of NAND gate 10, changes to 1 as C is 0. One gate delay interval later, at time $t_4'$, E changes to 0 as the three inputs to NAND gate 12, that is, D, $\overline{P}$ and A are all 1. One gate delay interval later, at time $t_5'$, C changes back to 1 as E now is 0.

The inputs A and C applied to NAND gate 18 cause this NAND gate to produce the output pulses B. These pulses are relatively positive (represent the bit 1) and a pulse B is produced one gate delay interval after the production of a pulse A or a pulse C as shown in FIG. 2. While not shown, it is to be understood that inverts may be employed to convert the relatively negative pulses A and C to relatively positive pulses, if desired. It is also to be understood that a NAND gate may be employed rather than inverter 8 if it is desired to use all identical logic gates in the circuit.

Figure 3:
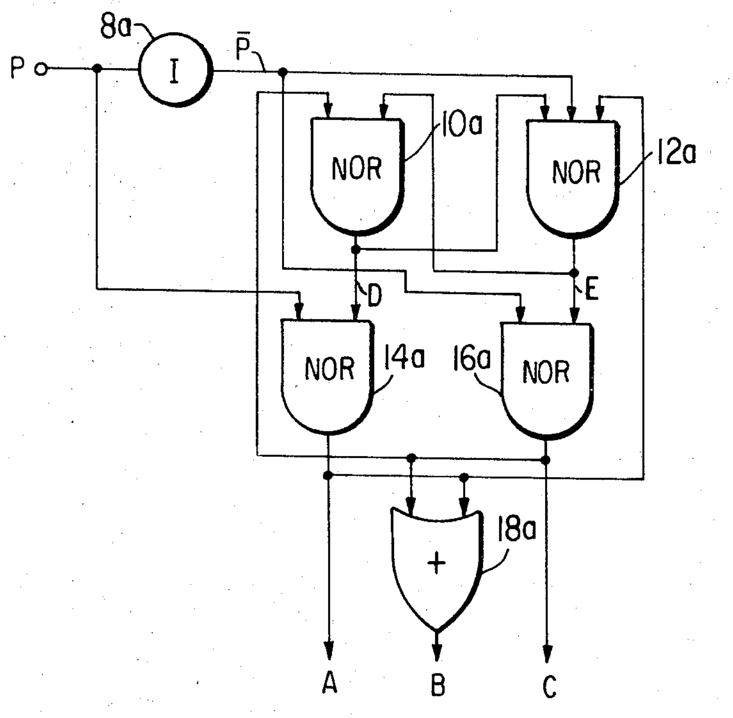
FIG. 3 is a logic diagram of a second form of the present invention.

A second implementation of the present invention is shown in FIG. 3. It includes 4 NOR gates **10*a*, 12*a*, 14*a* and 16*a* connected in the same way as the NAND gates 10, 12, 14 and 16 of FIG. 1**. A NOR gate implements the Boolean equation $Z=\overline{X+Y}=\overline{X}\cdot\overline{Y}$. The truth table for a NOR gate is

| X | Y | Z |
|---|---|---|
| 0 | 0 | 1 |
| 0 | 1 | 0 |
| 1 | 0 | 0 |
| 1 | 1 | 0 |

In addition to the NOR gates, the circuit of FIG. 3 includes an inverter **8*a* corresponding to the inverter 8 of FIG. 1. The circuit also includes an OR gate connected to receive the outputs A and C of NOR gates 14*a* and 16*a*** respectively.

The operation of the circuit of FIG. 3 is quite similar to that of the circuit of FIG. 1. However, the NOR gates **14*a* and 16*a* produce pulses representing the bit 1 rather than the pulses representing the bit 0 produced by the circuit of FIG. 1. In addition, the OR gate 18*a* also produces a pulse representing a 1 whenever either A=1 or C=1**.

The operation of the circuit of FIG. 3 is fully described in the truth table which follows:

| Time | — | $t_0$ | $t_1$ | $t_2$ | $t_3$ | $t_4$ | $t_5$ | $t_0'$ | $t_1'$ | $t_2'$ | $t_3'$ | $t_4'$ | $t_5'$ | $t_6'$ |
|---|---|---|---|---|---|---|---|---|---|---|---|---|---|---|
| P | 1 | 0 | 0 | 0 | 0 | 0 | 0 | 1 | 1 | 1 | 1 | 1 | 1 | 1 |
| $\overline{P}$ | 0 | 0 | 1 | 1 | 1 | 1 | 1 | 1 | 0 | 0 | 0 | 0 | 0 | 0 |
| A | 0 | 0 | 1 | 1 | 1 | 0 | 0 | 0 | 0 | 0 | 0 | 0 | 0 | 0 |
| E | 1 | 1 | 1 | 0 | 0 | 0 | 0 | 0 | 0 | 0 | 0 | 1 | 1 | 1 |
| D | 0 | 0 | 0 | 0 | 1 | 1 | 1 | 1 | 1 | 1 | 0 | 0 | 0 | 0 |
| C | 0 | 0 | 0 | 0 | 0 | 0 | 0 | 0 | 0 | 1 | 1 | 1 | 0 | 0 |
| B | 0 | 0 | 0 | 1 | 1 | 1 | 0 | 0 | 0 | 0 | 1 | 1 | 1 | 0 |

I claim:

1. A circuit for detecting a change in voltage level in either sense comprising, in combination:
   - first and second cross-coupled logic gates;
   - a third logic gate connected to receive the output of the first logic gate;
   - a fourth logic gate connected to receive the output of the second logic gate;
   - a feedback connection from the output of the third logic gate to the second logic gate;
   - a feedback connection from the output of the fourth logic gate to the first logic gate; and
   - means for applying the voltage whose level is being sensed and which is indicative of a binary digit of one value to said third logic gate and a complementary voltage level indicative of the binary digit of other value to the second and fourth gates.

2. In the combination set forth in claim 1 said four gates comprising four NAND gates.

3. In the combination set forth in claim 1 said four gates comprising four NOR gates.

4. In the combination set forth in claim 1 a fifth gate coupled to said third and fourth gates for producing an output pulse when either the third or fourth gate produces an output pulse.